United States Patent [19]

Tashiro et al.

[11] Patent Number: 4,990,937

[45] Date of Patent: Feb. 5, 1991

[54] DEVICE FOR SUPPORTING A PRINT HEAD

[75] Inventors: Mitsuo Tashiro; Akira Matsushima, both of Tokyo, Japan

[73] Assignee: Seikosha Co., Ltd., Tokyo, Japan

[21] Appl. No.: 478,599

[22] Filed: Feb. 12, 1990

[30] Foreign Application Priority Data

Apr. 24, 1989 [JP] Japan .................................. 1-104279

[51] Int. Cl.[5] .............................................. G01D 15/16

[52] U.S. Cl. ............................. 346/139 R; 346/139 C; 346/76 PH; 400/120

[58] Field of Search .......... 346/139 C, 139 R, 76 PH; 400/120

[56] References Cited

U.S. PATENT DOCUMENTS 4,626,873 12/1986 Kotani et al. .................... 346/139 C

FOREIGN PATENT DOCUMENTS 0176076 10/1984 Japan ............................... 346/139 C

*Primary Examiner*—Mark J. Reinhart
*Assistant Examiner*—Huan Tran
*Attorney, Agent, or Firm*—Jordan and Hamburg

[57] ABSTRACT

A device for supporting a print head includes a tabular print head capable of contacting a platen, the print head being mounted on a head-supporting plate retained by a supporting shaft. A central part of the supporting shaft is supported on a fixed receiver plate. The head-supporting plate is subjected to spring forces from two springs on both sides of the receiver plate. Side plates are provided with elongated grooves extending normal to a tangential direction at a contact point of the platen with the print head, and both ends of the supporting shaft extend through the grooves. Displacement takes place at both ends of the supporting shaft, corresponding to distortion and deflection of the platen in cooperation with the grooves. The laterally elongate print head uniformly contacts over its entire length against the platen with automatic equilibrium requiring no adjustment.

13 Claims, 2 Drawing Sheets

DEVICE FOR SUPPORTING A PRINT HEAD

BACKGROUND OF THE INVENTION:

The present invention relates to a device for supporting a tabular print head having a length sufficient to effect one-line printing on a chart passing between the print head and a platen upon which the head elastically impinges.

This type of print head assumes a configuration which is considerably elongate sideways, and it is therefore quite difficult to uniformly impinge the platen with the print head over its entire length, resulting in an often occurring phenomenon in which unevenness in density can be seen in the one-line printing. Under such circumstances, the applicants of the present invention proposed the invention disclosed in Japanese Patent Publication No. 64-11472. The arrangement is as follows. Fixed at a spacing to a rear surface of a tabular head substrate are a pair of mounting plates formed with crooks. A supporting shaft is provided with a pair of supporting levers each independently rotatable, which are in turn provided with erectly bent members spaced from the crooks of the mounting plates. Springs are interposed between the crooks and the erectly bent members to which screws for adjusting the height of the head substrate are spirally attached, penetrating the crooks. The adjusting screws serve to independently bilaterally adjust the level of the head substrate. The supporting levers are biased by spring forces to thereby thrust the head substrate against the platen disposed in front.

The construction of the prior art device described above involves the use of a good number of components such as the mounting plates, the height-adjusting screws, the springs wound on the screws and also the springs for thrusting the head substrate against the platen. This results in laborious assembly. In addition, the adjusting screws have to be rotated, resulting in a complicated adjustment.

SUMMARY OF THE INVENTION:

It is an object of the present invention to provide a device for supporting a print head arranged such that errors at both ends are absorable while surely maintaining a position of the print head, the construction being simplified by reducing the number of components, and a platen is uniformly impinged with the laterally elongate print head over its entire length without requiring any adjustment.

To accomplish this object, according to one aspect of the invention, there is provided a device for supporting a print head, comprising a head-supporting plate mounted with a tabular print head having a length sufficient to effect one-line printing so that the print head is allowed to impinge against a platen; a supporting shaft for supporting the head-supporting plate; a fixed receiver plate through which a central part of the supporting shaft extends; elongated grooves extending parallel to a tangential plane at the contact point of the platen with respect to the print head, the grooves being provided in side plates as to receive both ends of the supporting shaft; and springs secured to the head-supporting plate for imparting spring forces to the print head to thereby impinge against the platen.

Based on this construction, the central part of the supporting shaft for the head-supporting plate extends through the fixed receiver plate. The spring forces of the two springs are applied on both sides of the receiver plate. When the platen is impinged by the print head fixed to the head-supporting plate, distortion is caused in, e.g., the head-supporting plate, or in the supporting shaft. If the impingement over the entire length thereof is ununiform, it follows that the supporting shaft end on the side of intensive impingement moves within the elongated groove and acts to weaken the pressing forces. However, on the side of weak impingement, the other end thereof moves within the elongated groove and acts to intensify the pressing force. Thus, the print head automatically uniformly contacts the platen.

BRIEF DESCRIPTION OF THE DRAWINGS:

Other objects and advantages of the invention will become apparent during the following discussion taken in conjunction with the accompanying drawings.

The drawings in combination show one embodiment of the present invention.

Figure 1:
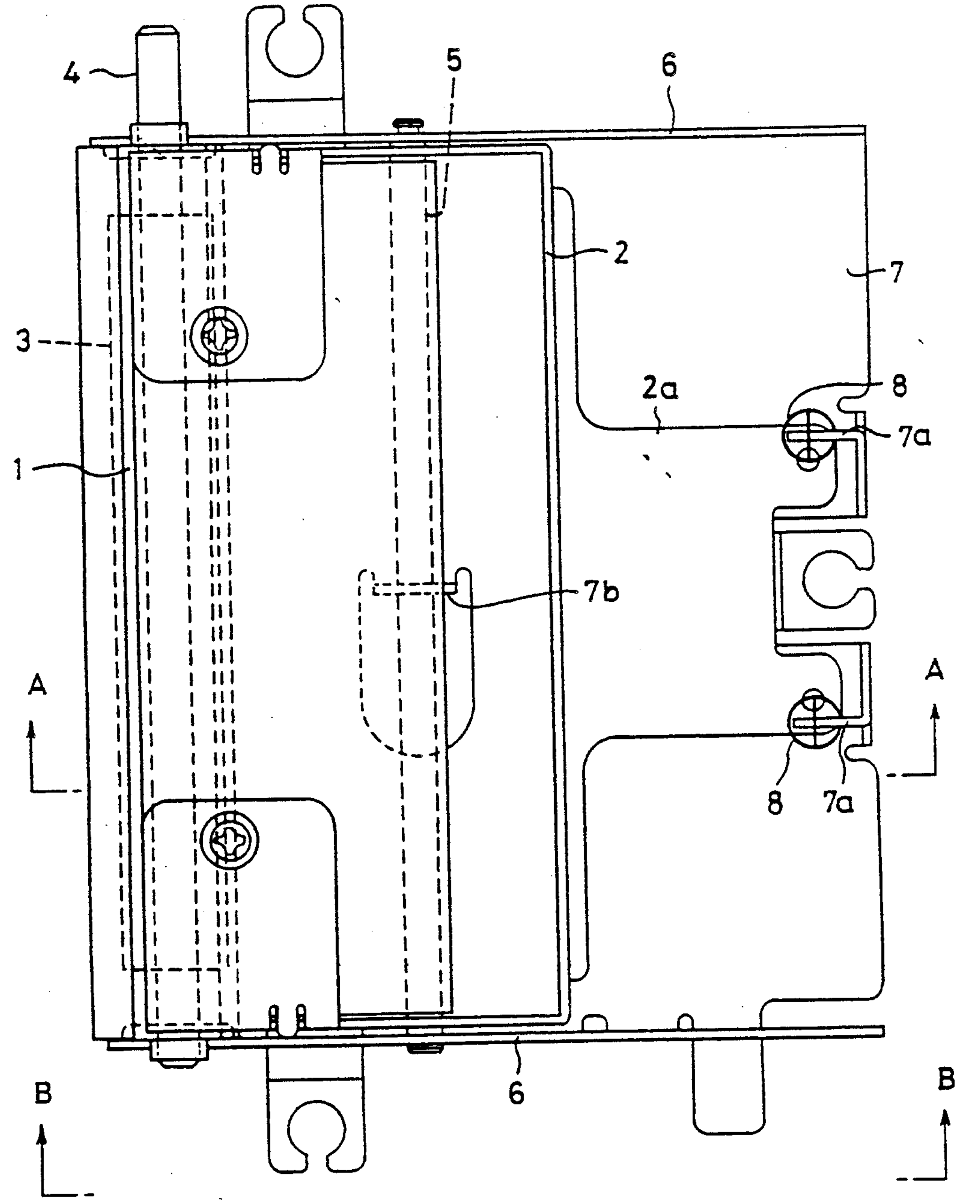
FIG. 1 is a plan view illustrating the principal part of a device for supporting a print head.
Figure 2:
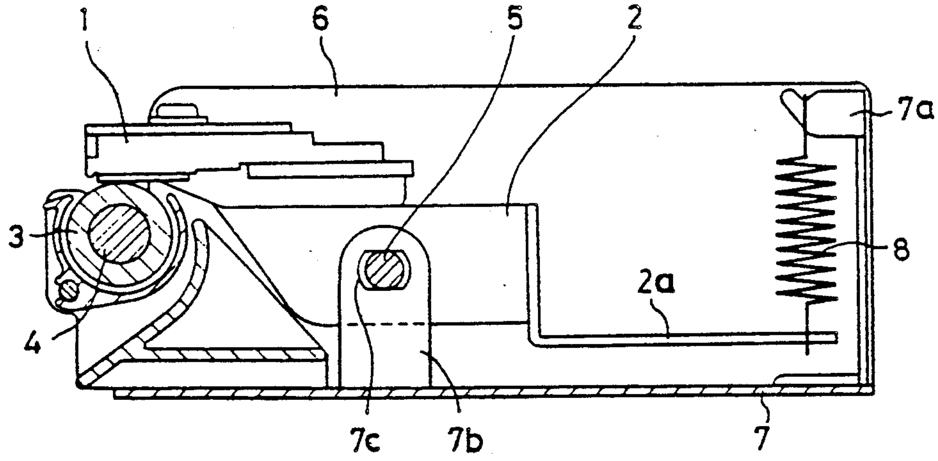
FIG. 2 is a sectional view taken substantially along the line A—A of FIG. 1.
Figure 3:
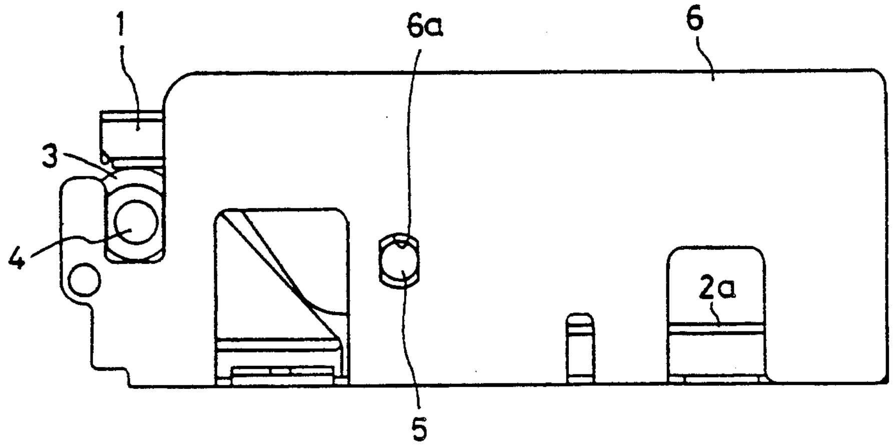
FIG. 3 is a front elevation taken in the direction along the line B—B of FIG. 1.

DESCRIPTION OF THE PREFERRED EMBODIMENT:

As shown in FIGS. 1–3, a print head 1 classified as a thermal head has a length sufficient to perform one-line printing, corresponding to the width of a chart. The print head 1 is mounted on one end (leftmost in FIG. 1) of a head-supporting plate generally indicated at 2 so that the head is capable of impinging against a platen 3. The platen 3 is rotatably supported on a pair of side plates 6 with the aid of a center shaft 4. The other end (rightmost in FIG. 1) of the head-supporting plate 2 is formed with an elongating portion **2*a* extending therefrom. Engaging portions 7*a* are supported from a bottom plate 7. Stretched between the elongated portion 2*a* and the engaging portions 7*a* are two springs 8 for elastically impinging the print head 1 upon the platen 3**.

There will next be set forth a detailed description relating to the means for supporting a supporting shaft 5 for the head-supporting plate 2. As shown in FIG. 2, the bottom plate 7 includes a fixed receiver plate **7*b* vertically disposed in a position which coincides with the center of the axial length of the print head 1. The receiver plate 7*b* is provided with an elongated groove 7*c* extending in the horizontal direction. The central part of the supporting shaft 5 passes through the elongated groove 7*c*. This arrangement restricts vertical displacement of the supporting shaft 5 only at the central part extending through the elongated groove 7*c*. However, at both ends of the supporting shaft 5 with the central part being located therebetween, vertically oscillatory movement thereof is possible. The two springs 8 are positioned in symmetry with respect to the receiver plate 7*b*. The springs 8 cause the head-supporting plate 2 to rotate counterclockwise about the supporting shaft 5 as shown in FIG. 2**.

Disposed in the side plates 6 are a pair of elongated grooves **6*a* extending vertically, through which both ends of the supporting shaft 5 pass. With this arrangement, the end parts of the supporting shaft 5 are incapable of horizontal displacement but are so supported as to be vertically movable. Thus if the elongated grooves 6*a*** relatively deviate from each other in the horizontal direction, the central part of the supporting shaft 5 moves horizontally in the elongated groove *7c*, thus absorbing the deviation. It is therefore possible to prevent extra stress acting on the supporting shaft 5. The elongated grooves *6a* correspond to conditions under which the print head 1 impinges the platen 1 and hence as shown in FIG. 3, extend in a direction normal to a tangential plane at the contact point of the print head 1 with respect to the platen 3.

Based on this construction, the print head 1 is subjected to the spring forces of the two springs 8 from both sides of the fixed receiver plate *7b*, with the result that the print head elastically contacts the platen 3. If distortion and deflection are generated in the head-supporting plate 2 and the platen 3, and when the print head 1 fixed to the head-supporting plate 2 is ununiformly contiguous over its entire length relative to the platen 3, the end of the supporting shaft on the intensive impingement part moves upward within the elongated groove *6a* and acts to reduce the pressing forces. However, on the side of weak impingement, the supporting shaft end moves downward within the elongated groove *6a* and acts to intensify the pressing force. In this manner, the two springs 8 work independently on the print head 1, whereby the print head 1 automatically uniformly impinges its entire length against the platen 3.

Note that the groove *7c* is not limited to the elongate configuration but may assume, e.g., a circular hole and other configurations which meet the requirement that the central part of the supporting shaft 5 can be retained at one point thereof.

As discussed above, the thus constructed device for supporting the print head provides the following advantages. The central part is supported on the fixed receiver plate so that the print head position can surely be maintained. In addition, at both ends the displacement can be effected corresponding to the distortion and deflection of the platen in cooperation with the elongated grooves. It is therefore feasible to attain enhancement of printing quality and also a reduction in cost owing to the arrangement that the laterally elongate print head automatically uniformly impinges over its entire length against the platen without requiring any adjustment with a simple construction involving a small number of components.

Although the illustrative embodiment of the present invention has been described with reference to the accompanying drawings, it is to be understood that the present invention is not limited to that precise embodiment. A variety of modifications or changes may be effected therein by one skilled in the art without departing from the scope or spirit of the invention.

What we claim is:

1. In a printer, the combination comprising:

an elongated print head operable to effect one-line printing on a platen;

a support plate means mounting said print head;

an elongated support shaft on said support plate means, said support shaft having a central portion and end portions;

pivot support means for pivotably supporting said central portion of said support shaft;

shaft support means supporting said end portions of said support shaft, said shaft support means having elongated grooves elongated in a direction parallel to a diametrical line of said platen which extends through the point of contact of said platen by said printer; and two biasing means connected to said support plate means at two longitudinally spaced locations of said support plate means such that said two biasing means bias said support plate means at said two longitudinally spaced locations in a pivotal direction to cause said print head to impinge against said platen, said end portions of said shaft being displaceable in said elongated grooves to thereby provide substantially uniform impingement of said print head against said platen along the longitudinal length of said print head.

2. In a printer according to claim 1, wherein said pivot support means supports said central portion of said support shaft for pivotal movement about said pivot support means as said end portions of said shaft displaceably move in said elongated grooves.

3. In a printer according to claim 1 wherein said support shaft has a pivotal axis, said support plate means having a transverse center line perpendicular to said pivotal axis, said biasing means comprising one spring on one side of said transverse center line and another spring on the other side of said transverse center line.

4. In a printer according to claim 3 wherein said pivot support means is disposed on said transverse center line.

5. In a printer according to claim 3 wherein said transverse center line divides said support plate into two connected half sections, one of said spring means biasing one half section in said pivotal direction while the other of said spring means biases the other half section in said pivotal direction.

6. In a printer according to claim 1 wherein said grooves have two spaced planar walls parallel to one another and parallel to said diametrical line.

7. In a printer according to claim 6 wherein said support shaft has a diameter substantially equal to the spacing between said two planar walls.

8. In a printer according to claim 1 wherein said support shaft and said platen each have a longitudinal axis parallel to one another, said two biasing means each comprising elongate springs having central axes generally perpendicular to said platen and support shaft axis.

9. In a printer, the combination comprising:

an elongated printer head operable to effect one-line printing on a platen;

a support plate means mounting said print head;

an elongated support shaft on said support plate means, said support shaft having a longitudinal central portion and longitudinal end portions;

pivot support means for pivotably supporting said central portion of said support shaft;

shaft support means supporting said longitudinal end portions of said support shaft, said shaft support means having elongated grooves through which said longitudinal end portions of said shaft extend; and biasing means connected to said support plate means, said platen being disposed on one side of said support shaft and said biasing means being disposed on the opposite side of said support shaft, said biasing means being connnected to said support plate means at longitudinally spaced locations such that said biasing means biases said support plate means in a pivotal direction to cause said print head to impinge against said platen, said longitudinal end portions of said shaft being displaceable in said elongated grooves to thereby provide substantially uniform impingement of said print head against said platen along the longitudinal length of said print head.

10. In a printer, the combination comprising:

an elongated print head operable to effect one-line printing on a platen;

a support plate means mounting said print head;

an elongated support shaft on said support plate means, said support shaft having a longitudinal central portion and longitudinal end portions;

pivot support means for pivotably supporting said central portion of said support shaft;

shaft support means supporting said longitudinal end portions of said support shaft, said shaft support means comprising a bottom support means having spaced upright walls, said upright walls having elongated grooves through which said longitudinal end portions of said shaft extend, said pivot support means comprising an upright member extending upright from said bottom support means; and biasing means connected to said support plate means at longitudinally spaced locations such that said biasing means biases said support plate means in a pivotal direction to cause said print head to impinge against said platen, said longitudinal end portions of said shaft being displaceable in said elongated grooves to thereby provide substantially uniform impingement of said print head against said platen along the longitudinal length of said print head.

11. In a printer, the combination comprising:

an elongated print head operable to effect one-line printing on a platen;

a support plate means mounting said print head;

an elongated support shaft on said support plate means, said support shaft having a longitudinal central portion and longitudinal end portions;

pivot support means for pivotably support said central portion of said support shaft;

shaft support means supporting said longitudinal end portions of said support shaft, said shaft support means having elongated grooves through which said longitudinal end portions of said shaft extend, said grooves being elongated in a direction parallel to a diametrical line of said platen which extends through the point of contact of said platen by said printer, said pivot support means comprising an opening elongated in a direction perpendicular to said diametrical line; and biasing means connected to said support plate means at longitudinally spaced locations such that said biasing means biases said support plate means in a pivotal direction to cause said print head to impinge against said platen, said longitudinal end portions of said shaft being displaceable in said elongated grooves to thereby provide substantiialy uniform impingement of said print head against said platen along the longitudinal length of said print head.

12. In a printer according to claim 11 wherein said opening has two spaced planar walls parallel to one another and each perpendicular to said diametrical line.

13. In a printer according to claim 12 wherein said two spaced planer walls of said opening are spaced from one another a distance which is substantially equal to the diameter of said support shaft.

* * * * *